Patented Aug. 6, 1929.

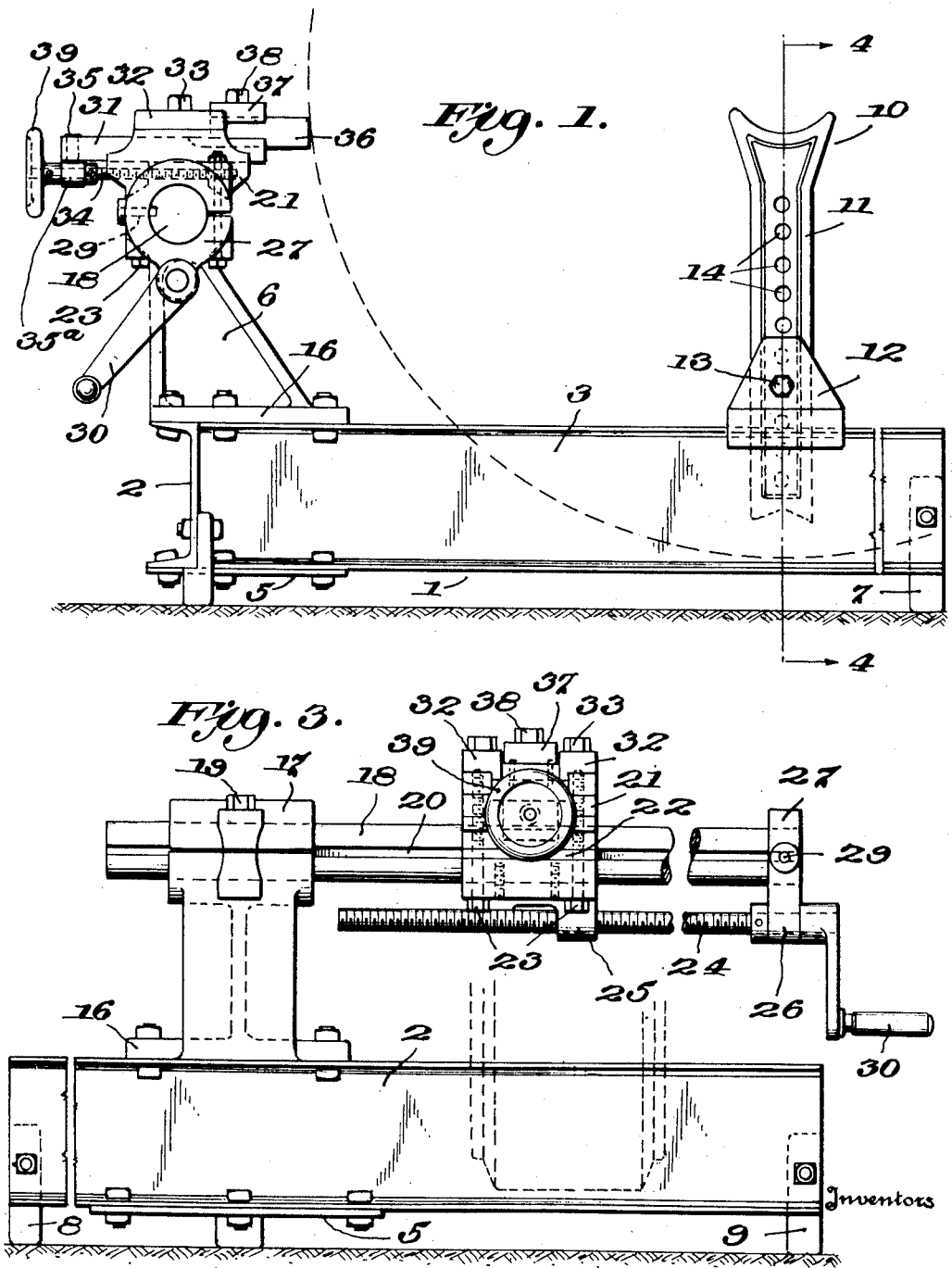

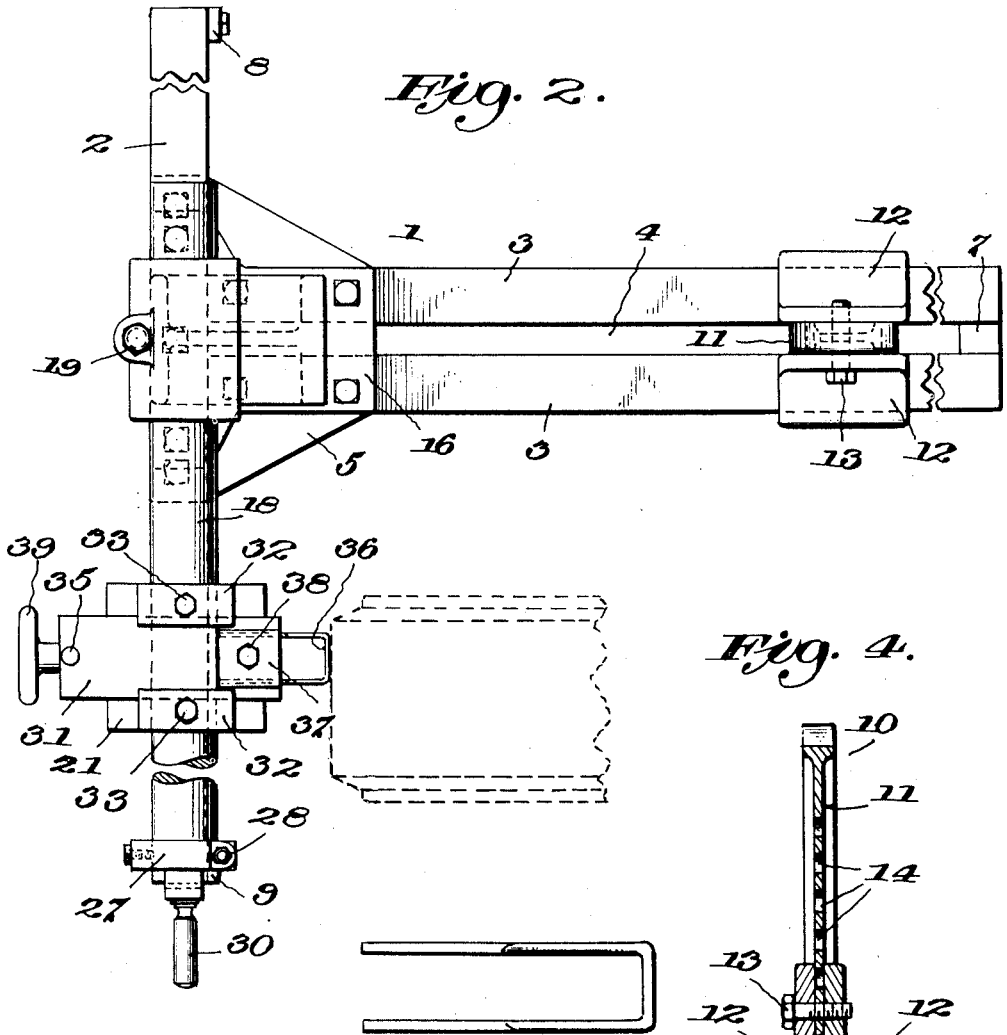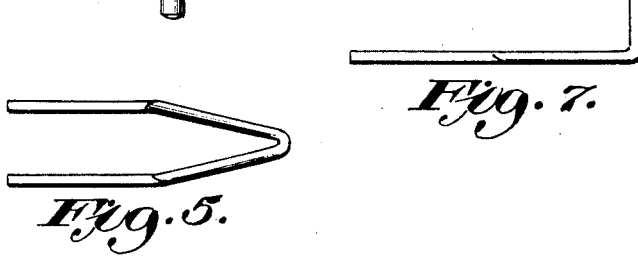

1,723,221

UNITED STATES PATENT OFFICE.

FRANCIS M. VANDERVOORT AND HOMER D. PAXSON, OF SALEM, OHIO.

PORTABLE TIRE LATHE.

Application filed April 6, 1927. Serial No. 181,587.

This invention relates to portable tire lathes and more particularly to a portable tire lathe for truing and/or grooving worn solid rubber tires while on the vehicle and rotated preferably by the motive power of the vehicle.

Attempts have heretofore been made to provide and operate a portable tire lathe for the purpose above mentioned, but due to the resilient nature and toughness of the substance operated upon, the relatively, crudely-controlled source of power used, and the inability of the person operating the tool to directly control the source of power at the same time, these attempts have failed because of the difficulty, under the above working conditions, of holding the cutting tools steady and thus these prior devices are unreliable and dangerous to operate.

The chief object of the present invention is to overcome this objection by the provision of a portable lathe for the above purpose which, while sufficiently light in structure to render it portable, will be steady, reliable, and safe to operate. This object of the invention is accomplished by a novel construction and arrangement of parts whereby the machine is made to carry a portion of the weight of the vehicle over a three point suspension or bearing between the base or frame of the lathe machine and the ground or floor.

Another object of the invention is to provide means for rocking the cutting tool to adjust or vary the amount of cutting clearance during operation which also makes for reliability and safety in operation due to the fact that the tendency of the tool to bind or chatter is affected by the angle of clearance, and that the proper adjustment of such clearance is in turn dependent on the quality of the material being cut, making it desirable to make such adjustment during operation.

A further object of the invention, the accomplishment of which accrues to the reliability of operation, is the provision of means for increasing the accuracy of adjustment of parts. This object is accomplished by the use of an aligning rod arranged to cooperate with the other elements of the device in a manner to afford close comparison of the lines of feed movement of the cutting tool with the axis of rotation of the tire.

Other objects and advantages of the invention will be apparent from a perusal of the following specification and the drawings accompanying the same.

A preferred embodiment of the invention is illustrated in the accompanying drawings in which:

Fig. 1 is a side elevation of the device set up in operating position, with an arc in dotted lines indicating the relative position of the circumference of the tire being operated upon, a showing of the actual tire and vehicle being omitted for the sake of clearness.

Fig. 2 is a top plan view of the device.

Fig. 3 is an end view looking to the right of Fig. 1.

Fig. 4 is a section on the line 4—4 of Fig. 1.

Figs. 5 and 6 are plan and vertical sectional views, respectively, of a grooving tool.

Fig. 7 is a plan view of a turning tool.

Fig. 8 is a perspective view of the aligning rod.

Referring to the drawings in detail, and first to Figs. 1 to 4, the main frame or base member of the machine is T-shaped in form, consisting in the main of a longitudinal beam element 1 and a transverse beam element 2. The longitudinal beam 1 is constructed of a pair of channel irons 3 arranged back to back and spaced apart to form the single beam 1 with a slot 4. The beam 1 is secured to the transverse beam 2, consisting of a single channel iron, by means of a suitable binding plate 5 and the foot 16 of the casting 6, secured to the beams by nuts and bolts as shown. The channel members 3 are secured in spaced relation at the free end of the beam 1 by a lug or foot piece 7 bolted therebetween and extending downwardly to form a supporting foot. Other lugs or foot members 8 and 9 are secured to the opposite ends, respectively, of the transverse beam 2, and these foot members, together with the foot member 7, form a three point suspension or bearing for the base member as a whole.

Adjustably mounted in the slot 4 is an upright member 10 constituting a vehicle support or jack and comprising a post 11 of I-shaped cross section arranged to be clamped in the space 4 by the channel beams 3 at different points along said beams and at different heights by means of the clamping plates 12 and bolt 13. The adjustment of height is accomplished by means of a series of bolt holes 14 formed in the web of the post while a firm clamping effect acting to prevent tipping or rocking of the post is accomplished by the provision of reentrant hooks 15 on the bottoms of clamping plates 12. It is to be noted in passing, that due to a certain amount of resiliency in the channel beams 3, the tightening of the clamping bolt 13 not only clamps the plates 12 against the sides of the upright post and the flanges of the channel beams, but draws the beams together into clamping engagement with the lower portion of the post extending down into the slot or space between the beams.

At the junction of the base members 1 and 2 is mounted an upright member 6 forming a tool support and comprised of a casting whose foot portion 16 forms the means of clamping the two base members together and whose upper portion carries a split socket 17. Removably and adjustably mounted in the split socket 17 is a guide shaft 18, which may be secured in the socket in any desired longitudinal or angular position by means of the clamp bolt 19. The shaft 18 is provided with a longitudinal guide slot or key way 20 and slidably mounted on the shaft is a tool carriage 21 held against turning on the shaft by means of a key 22 held in the carriage by the bolts 23.

For feeding the tool carriage along the guide shaft a feed screw shaft 24 is provided, which is arranged to pass through and be in threaded engagement with the feed lug 25 on carriage 21. Feed screw shaft 24 is journaled in a center bearing 26 clamped on the free end of the guide shaft 18 by means of a split ring clamp 27 and clamping bolt 28, the proper angular position of the bearing relative to the tool carriage being determined by a guide pin 29 adapted to engage in slot or key way 20. A suitable operating crank 30 is secured to the extreme outer end of the longitudinal feed screw shaft.

Slidably mounted in the tool carriage 21 is a cross feed tool holder 31, held in place by the top plates 32 and bolts 33 and arranged to be fed transversely of the guide shaft by means of a screw shaft 34 rotatably mounted in bearing 35ª swiveled in the tool holder at 35 and passing through and in threaded engagement with the central portion of the tool carriage as shown in dotted lines in Fig. 1. A U-shaped cutting tool 36 is clamped on the extreme forward end of the tool holder 31 by means of a top clamping plate 37 and clamping screw 38, the upper face of the end of the tool holder and the lower face of the clamping plate 37 having grooves milled therein, as indicated in dotted lines, to receive the shanks or arms of the U-shaped tool 36. At the unthreaded end of the feed screw 34 and outside the swiveled bearing is fastened a suitable operating wheel 39.

Although any suitable cutting tool may be used, the ones illustrated are preferred. As shown in Figs. 5, 6 and 7 they comprise a strip of metal provided, by bending or otherwise, with a return bend so that the finished tool is of general U-shape. Before the bend is provided in the strip, one side is made convex by turning, grinding or otherwise, the grinding being continued until the edges or a portion of the edges of the strip are suitable for cutting. When the tool is formed, the convex or curved side of the strip is to the inside, the flat or plane side being to the outside. A cutting tool with two cutting edges, both of which lie in a common plane, is thus provided and by shifting this plane angularly relative to the work, the cutting clearance of the tool is shifted correspondingly.

In operation, with the several parts about in the position shown, the center beam 1 of the base of the device is placed under the truck or other vehicle, a tire of which is to be operated upon from the rear of the truck, slightly inside the wheel carrying the tire to be operated upon, so as to bring the various parts of the machine and the tire in approximately the relative position indicated in the drawings, where the outline of the tire is indicated in dash line. The wheel, in this case the rear right wheel, is then jacked up to raise it and its tire clear of the ground and the base member and the support or jack 10 adjusted to supporting position under the wheel axle and clamped, after which the jack used for raising the wheel is removed, leaving the right rear portion of the truck in raised position supported by the upright 10, through which the weight of this portion of the truck is transmitted to the base member to firmly hold the same fixed in relation to the truck.

Just before removing the lifting jack to transfer the weight to the base member, a fine adjustment of the position of the device relative to the tire, and especially the angular position of the feed movements of the tool, is effected by moving the tool carriage toward the free end of the guide shaft a sufficient amount to clear the outside or extreme right-hand plane of the tire and its rim, and the aligning rod 40 of Fig. 8 secured in the tool carriage in place of the tool holder and in parallelism with its direction of feed in a manner to extend from the tool holder across the outside face of the tire rim, whereby the whole device may be adjusted in position to bring the aligning rod and consequently the cross feed into parallelism with the plane of the rim, and also to bring the longitudinal feed motion of the tool carriage into parallelism with the axis of the tire. After this adjustment the aligning rod is removed and the tool holder 39 with the tool 36 clamped therein is replaced in the tool carriage.

With the parts thus assembled and adjusted and the weight of the rear portion of the truck resting on the base member to firmly hold the parts in such adjustment, the two feed screws are operated to move the tool approximately into the position shown and the driving motor of the vehicle operated to rotate the wheel backwards. With the wheel thus in motion the feed screws are manipulated to guide the tool in a well known manner to true down the tire, or groove the tread, the proper tool being used according to whether a truing down or grooving is desired.

If during operation the tool is found to have a tendency to bind or chatter or otherwise indicate a requirement for an adjustment of the cutting clearance of the tool, the feed shaft clamping bolt 19 may be turned slightly to ease the clamping hold of the guide shaft socket 17 whereupon the angular position of the shaft and consequently that of the tool may be adjusted to vary the cutting clearance of the tool.

When the device is used for operating on the left hand wheel of the truck, the parts are symmetrically reversed by reversing the position of the guide shaft in its clamping socket, so as to project from the left side thereof, and at the same time reversing the position of the tool holder 31 by threading its feed screw all the way out, removing it and reinserting it from the other side of the tool carriage.

While we have thus shown and described a specific embodiment of our invention for the sake of disclosure, it is to be understood that the invention is not limited to such specific embodiment, but contemplates all such variants and modifications thereof as fairly fall within the scope of the appended claims.

What is claimed is:

1. A tire lathe comprising a base member, means for supporting a portion of a vehicle on said base member with a wheel of the vehicle and its tire free of the ground and said base and said supporting means, a tool carriage support mounted on the base substantially in alignment with said supporting means, a tool carriage guide shaft arranged to be mounted on said carriage support to extend laterally therefrom substantially parallel to the axis of the wheel on either side of the said carriage support according to whether the tire of the right or left wheel of the vehicle is to be operated upon, a tool carriage splined on said guide shaft, carriage feeding means for feeding said carriage along the shaft, a cross feed tool holder mounted in said carriage, means for angularly adjusting said guide shaft in said tool carriage support to vary the angle of the holder, said tool holder being removably mounted in the carriage for reversal when the guide shaft is reversed or transferred from one side of the carriage support to the other.

2. A tire lathe comprising a base member, means for supporting a portion of a vehicle on said base member with a wheel of the vehicle and its tire free of the ground and said base and said supporting means, a tool carriage support mounted on the base, a tool carriage guide way arranged to be mounted in said carriage support to extend laterally therefrom substantially parallel to the axis of the wheel on either side of the carriage support according to whether the tire of the right or left wheel of the vehicle is to be operated upon, a tool carriage slidably mounted on said guide way, means for feeding said carriage along said guide way, a cross feed tool holder mounted in said carriage, means for adjusting the vertical angle of said guide way and carriage in said tool carriage support to vary the angle of the tool holder, said tool holder being removably mounted in the carriage for reversal when the guide way is reversed or transferred from one side of the carriage support to the other.

3. A tire lathe comprising a base member, means for supporting a portion of a vehicle on said base member with a wheel of the vehicle and its tire free of the ground and said base and said supporting means, a tool carriage support mounted on the base, a tool carriage guide way arranged to be mounted in said carriage support to extend laterally therefrom substantially parallel to the axis of the wheel on either side of the carriage support according to whether the tire of the right or left wheel of the vehicle is to be operated upon, a tool carriage slidably mounted on said guide way, means for feeding said carriage along said guide way, a cross feed tool holder mounted in said carriage, and means for adjusting the vertical angle of said guide way and carriage in said tool carriage support to vary the angle of the tool holder.

4. A tire lathe comprising a base member, an upright mounted on said base member, a tool carriage slidably mounted on said upright, a cross feed tool holder mounted in said carriage, means for adjustably securing said base member and parts carried thereby in position relative to a tire to be operated upon to position the tool carriage for movement parallel to the axis of the tire and the tool holder for feed movement parallel to the plane of rotation of the tire, and an aligning rod arranged to replace said tool holder and be held in alignment with the direction of feed of the tool holder to aid in aligning the direction of feed with the plane of rotation of the wheel during adjustment of the base member.

5. A tire lathe comprising a base member, an upright mounted on the base member, a tool holder slidably mounted on said upright, means for adjustably securing the base member and upright in position relative to the tire to be operated upon on a vehicle, and an aligning rod arranged to replace said tool holder for alignment of the direction of sliding movement of said tool holder with the tire rim during the adjustment of the base member and tool support relative to the tire.

In testimony whereof we hereunto affix our signatures.

FRANCIS M. VANDERVOORT.
HOMER D. PAXSON.